UNITED STATES PATENT OFFICE 2,636,888

FRACTIONATION OF OAT OIL AND USE OF SAME

Ernest L. Washburn, Wilmette, Ill., assignor to The Quaker Oats Company, Chicago, Ill., a corporation of New Jersey No Drawing. Application February 15, 1950, Serial No. 144,389

4 Claims. (Cl. 260—403)

The present invention relates to the fractionation of oat oil and it also relates to the use of such fractions for addition to foodstuffs where a product having high emulsifying properties is desirable.

It is among the objects of the present invention to produce an improved oat oil extract particularly suitable for addition to food products as well as to other compositions where an efficient emulsifier is desirable, which extract may be readily produced at low cost and which may be used for addition or admixture with foods without imparting any undesirable flavors and/or odors thereto. Another object of the invention is a process for the separation of oat oil into fractions each of which will have a greater value than the original oil. Still another object provides a simple and convenient method for separating the oil into fractions one of which is a good emulsifier. Other objects and advantages will be apparent as this invention is hereinafter more fully described.

The final product which is obtained first by extraction of oats with hexane, second fractionation of the extract with an alcohol-ether solution, followed by acetone purification is after the final separation relatively free of coagulated residues and may be readily admixed with food compositions without leaving any undesirable residues in the food composition undergoing treatment.

In order to disclose the nature of the present invention still more clearly an illustrative example will hereinafter be described. It should be understood, however, that this is done purely for purposes of illustration and is not to be considered a limitation upon the spirit or scope of the invention.

Example

About 1 part of crude oat oil obtained by the extraction of rolled oats with hexane was stirred with about 3 parts of a mixed solvent consisting of 1 part ether and 2 parts methanol at a temperature of approximately 25° C. for 15 minutes. The batch was then permitted to stand until two layers separated. The upper layer was removed and preferably the lower layer was again treated with the ether-methanol solution. The mixture was allowed to stand until two layers formed and then the upper layer was removed. After removing the solvent from the combined ether-methanol layers by distillation, 10 parts of acetone was added to the ether-methanol extract and then the mixture was allowed to stand about ½ hour at 0° C. which caused the precipitation of a dark waxy solid. After recovering the precipitate by decanting, it was again suspended in warm acetone, cooled and allowed to settle as before. Yield of product was about 10 per cent. It analyzed 0.67 per cent nitrogen and 0.9 per cent phosphorus. Other samples have varied in nitrogen and phorous content from about 0.6 to 0.8 per cent for the former and 0.8 to 1.0 per cent for the latter. If desired this fraction may be purified further by washing with acetone.

While I have described the use of an oat oil obtained by the extraction of rolled oats with hexane, the invention is not confined to the employment of those two materials. As for example, other oat products such as whole or steel-cut oat groats or even oat flour may be used. In addition to hexane other fat solvents may be used such as hydrocarbons, ethers, or halogen substituted hydrocarbons. Other modifications of the process will be apparent to those skilled in the art, as for example, the order in which the two solvents, hexane or other fat solvent and the ether-methanol solution are used in the example, may be reversed if desired. As another alternative method the oat product may be extracted directly with the ether-methanol solution, in which case the extract so obtained may be treated with acetone as described in the example, causing the precipitation of the emulsifier fraction.

This emulsifier may be used with those foods where a product possessing high emulsifying properties is desirable. For example, it may be added to chocolate to lower its viscosity thus imparting to the chocolate the property of forming a uniform and smooth coating on candy. In commercial practice chocolate, liquor, sugar, cocoa butter, and in some instances milk powder, are ground together to produce an intimate mix known as dipping chocolate or chocolate coating. The inclusion of 0.2 to 0.3% lecithin in the mixture produces a "wetting" action which allows every chocolate particle to be more intimately wetted by the fat which allows a reduction in cocoa butter requirement without an increase in viscosity. As a general statement, it may be said that the addition of 0.35% lecithin is equivalent to 8.0% cocoa butter in the attainment of minimum viscosity. To determine the effectiveness of the emulsifier for this purpose the viscosities of chocolate containing varying amounts of the emulsifier, and chocolate containing soya lecithin, were determined at 37.8° C. The results are tabulated below.

TABLE
VISCOSITY OF CHOCOLATE MIXTURES

| Ounces of Emulsifier per cwt. of chocolate | Standard Soya Lecithin | Oat Oil Emulsifier |
|---|---|---|
| 0 | 620 | 620 |
| 0.5 | | 384 |
| 0.75 | | 264 |
| 1.0 | 300 | 176 |
| 1.5 | | 124 |
| 2.0 | 212 | 96 |
| 3.0 | 188 | 72 |
| 4.0 | 176 | 80 |

An inspection of this table demonstrates that the emulsifier recovered from oat oil is better than standard soya lecithin in modifying the viscosity of chocolate.

This emulsifier may be used with other types of confectionary products containing fat such as caramels and nougats as an aid in forming a smooth emulsion between the fat and sugar syrup base. It may be used in nearly all types of bakery goods to enhance the effectiveness of the shortening, thereby producing more tender crusts and better freshness retention. It is also effective as an anti-spattering agent for magarine. In addition to its applications in the food field this emulsifier may be used where an efficient wetting agent is desired such as in the manufacture of paints and enamels, in cutting oils, with textile oils for improved penetration and better lubrication, and in the manufacture of cosmetic and pharmaceutical products where maximum penetration of the resulting product is desired.

While the invention has been described in detail, particularly in connection with the example, it is understood that such details may be modified widely by those skilled in the art, without departing from the spirit of my invention.

I claim:

1. A method of making an oat extract useful for addition to food products which comprises intimately contacting oat oil with an ether-methanol solvent, allowing the mixture to separate into upper and lower layers, separating said upper and lower layers, removing said ether-methanol solvent from said upper layer, adding acetone to the ether-methanol extract with cooling and then separating the acetone insoluble product from said acetone.

2. The method of claim 1 wherein the ether-methanol solvent consisted of 1 part ether and 2 parts methanol.

3. The product obtained by the method defined in claim 1.

4. The product obtained by the method defined in claim 2.

ERNEST L. WASHBURN.

References Cited in the file of this patent

MacLean, Lecithin and Allied Substances, pages 159–160, 73–74.

Paul, The Analyst, vol. 46, pages 238–239 (1921).

Jamieson, "Vegetable Fats and Oils," pages 308–9 (1943). Reinhold Publishing Corp., New York.